(12) United States Patent
Moore

(10) Patent No.: US 7,554,918 B1
(45) Date of Patent: *Jun. 30, 2009

(54) FAIR MULTIPLEXING SCHEME FOR MULTIPLE INPUT PORT ROUTER

(75) Inventor: Pete N. Moore, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 486 days.

This patent is subject to a terminal disclaimer.

(21) Appl. No.: 11/313,361

(22) Filed: Dec. 20, 2005

Related U.S. Application Data

(63) Continuation of application No. 09/388,804, filed on Sep. 1, 1999, now Pat. No. 7,016,301.

(51) Int. Cl.
*H04L 12/56* (2006.01)
(52) U.S. Cl. ...................................... 370/235
(58) Field of Classification Search ........................ None
See application file for complete search history.

(56) References Cited

U.S. PATENT DOCUMENTS

| | | | |
|---|---|---|---|
| 5,325,356 A | 6/1994 | Lyles | |
| 5,570,348 A | 10/1996 | Holden | |
| 5,633,861 A | 5/1997 | Hanson et al. | |
| 5,818,842 A | 10/1998 | Burwell | |
| 5,838,681 A | 11/1998 | Bonomi et al. | |
| 5,896,377 A | 4/1999 | Boot | |
| 5,983,278 A | 11/1999 | Chong et al. | |
| 6,075,771 A * | 6/2000 | Wolff et al. | 370/232 |
| 6,108,306 A | 8/2000 | Kalkunte et al. | |
| 6,108,307 A | 8/2000 | McConnell et al. | |
| 6,118,761 A * | 9/2000 | Kalkunte et al. | 370/229 |
| 6,119,235 A | 9/2000 | Vaid et al. | |
| 6,151,301 A | 11/2000 | Holden | |
| 6,157,614 A | 12/2000 | Pasternak et al. | |
| 6,160,808 A | 12/2000 | Maurya | |
| 6,198,722 B1 * | 3/2001 | Bunch | 370/229 |

(Continued)

*Primary Examiner*—Anh-Vu Ly
(74) *Attorney, Agent, or Firm*—Blakely, Sokoloff, Taylor & Zafman LLP

(57) ABSTRACT

The present scheme provides a mechanism for preventing traffic on one or more LAN ports from dramatically affecting performance on other LAN ports of a router resource. In one embodiment, the utilization of a router resource at the interface between a first number of a local area network ports and a second number of wide area network links by each LAN port is controlled according to the bandwidth availability of corresponding bundles of the WAN links assigned to each of the LAN ports and a switching capacity of the router resource. In this scheme, individual ones of the LAN ports may be permitted to exceed their fair share of the switching capacity of the router resource, but only if a current switching load due to the traffic from all of the LAN ports is less than the maximum switching capacity for the router resource as a whole. If the current switching load due to traffic from all of the LAN ports is equal to the maximum switching capacity of the router resource, however, those of the LAN ports that are attempting to utilize more than their fair share of the bandwidth availability or the switching capacity may be throttled back. Such throttling back may include dropping packets inbound on those LAN ports that are attempting to utilize more than their fair share of the resources, preferably at the entry point to the router resource.

15 Claims, 9 Drawing Sheets

U.S. PATENT DOCUMENTS

| | | |
|---|---|---|
| 6,202,094 B1 | 3/2001 | Grosser, Jr. et al. |
| 6,208,619 B1 * | 3/2001 | Takeuchi ................... 370/229 |
| 6,252,849 B1 * | 6/2001 | Rom et al. ................... 370/230 |
| 6,292,465 B1 | 9/2001 | Vaid et al. |
| 6,426,943 B1 | 7/2002 | Spinney |
| 6,563,821 B1 * | 5/2003 | Hong et al. ................. 370/389 |
| 6,615,271 B1 | 9/2003 | Lauck et al. |
| 6,717,912 B1 * | 4/2004 | Lemyre et al. .............. 370/230 |
| 7,016,301 B1 * | 3/2006 | Moore ........................ 370/235 |
| 2003/0048778 A1 | 3/2003 | Davison |
| 2003/0198241 A1 | 10/2003 | Putcha et al. |

* cited by examiner

FAIR MULTIPLEXING SCHEME FOR MULTIPLE INPUT PORT ROUTER

CROSS REFERENCE TO RELATED APPLICATION

The present application claims priority from and is a continuation application of U.S. patent application Ser. No. 09/388,804 filed Sep. 1, 1999, which issued as U.S. Pat. No. 7,016,301.

FIELD OF THE INVENTION

The present invention relates generally to routing resources that may be used in packet switching networks and, in particular, to a scheme for allocating switching resources of such a router among multiple input interfaces thereof.

BACKGROUND

Routers are commonly used at interfaces between local area networks (LANs) and wide area networks (WANs). For example, routers may be used to multiplex between "N" number of LAN interfaces and "M" number of WAN interfaces. Sometimes, the WAN interfaces may be grouped into bundles through the use of a multi-link protocol, such as the multi-link point-to-point protocol (MLPPP). Such MLPPP bundles may be associated with a specific LAN interface by either a static or policy-based routing implementation.

FIG. 1 illustrates a situation where a router resource 10 is used as an interface between N LAN ports 12 and M WAN links 14. The WAN links 14 are grouped into various bundles 16 of, for example, 3 4 or 5 WAN links.

Often, the individual LAN ports 12 are leased by separate customers, each with a variable amount of traffic to be switched through router resource 10. For example, in the situation illustrated in FIG. 1, there may be eight 10 BaseT LAN ports 12, each associated with a separate customer. These eight LAN ports may be associated through router resource 10 with 24 T1 WAN links 14, grouped into various bundles 16 assigned to the LAN ports 12. The bundling of WAN links 14 provides a variable amount of bandwidth to the customers connecting through the LAN ports 12.

Usually the individual customers have lease rates for router resource 10 associated with the number of WAN ports 14 assigned to their respective LAN interfaces. The number of WAN ports so bundled is generally determined by the amount of traffic the customer will have to transmit through router resource 10. However, owing to the nature in which router resource 10 operates, if one customer (or a few customers) over drives its (their) respective LAN interface(s) beyond capacity, router resource 10 can become overloaded and cause significant loss of performance for the other customers. That is, over driving just one of the LAN ports 12 may cause traffic on other LAN ports 12 to be dropped. What is needed, therefore, is a means of preventing traffic on one, or few, LAN ports of router resource from dramatically affecting performance on other LAN ports thereof.

SUMMARY OF THE INVENTION

The present scheme provides a mechanism for preventing traffic from one (or a few) LAN ports of a router resource from dramatically affecting performance on other LAN ports thereof. In one embodiment, the utilization of a router resource at the interface between a first number of local area network ports and a second number of wide area network links by each LAN port is controlled according to the bandwidth availability of corresponding bundles of the WAN links assigned to each of the LAN ports and a switching capacity of the router resource. In this scheme, individual ones of the LANs ports may be permitted to exceed their fair share of the switching capacity of the router resource, but only if a current switching load due to the traffic from all of the LAN ports is less than the maximum switching capacity for the router resource as a whole. If the current switching load due to traffic from all of the LAN ports is equal to the maximum switching capacity of the router resource, however, then those of the LAN ports that are attempting to utilize more than their fair share of the bandwidth availability or the switching capacity may be throttled back. Such throttling back may include dropping packets inbound on those LAN ports that are attempting to utilize more than their fair share of the resources, preferably at the entry point to the router resource. Such a scheme may also operate in the reverse direction, controlling traffic from the WAN links bound for the LAN ports.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

As indicated above, described herein is a scheme for controlling utilization of a router resource, which may be positioned at the interface between a number of LAN ports and a variety of WAN links. However, although this scheme will be described with reference to certain preferred embodiments, this description should not be read as limiting the more general applicability of the present invention, as expressed in the claims which follow. For example, the scheme may operate to control traffic bi-directionally. That is, traffic inbound on the WAN links may be controlled in a like manner. Also, the router resource may be any device configured as a router or not. Accordingly, the schemes described herein, and the test results presented therewith, should be regarded as exemplary, and not exclusionary.

Figure 1:
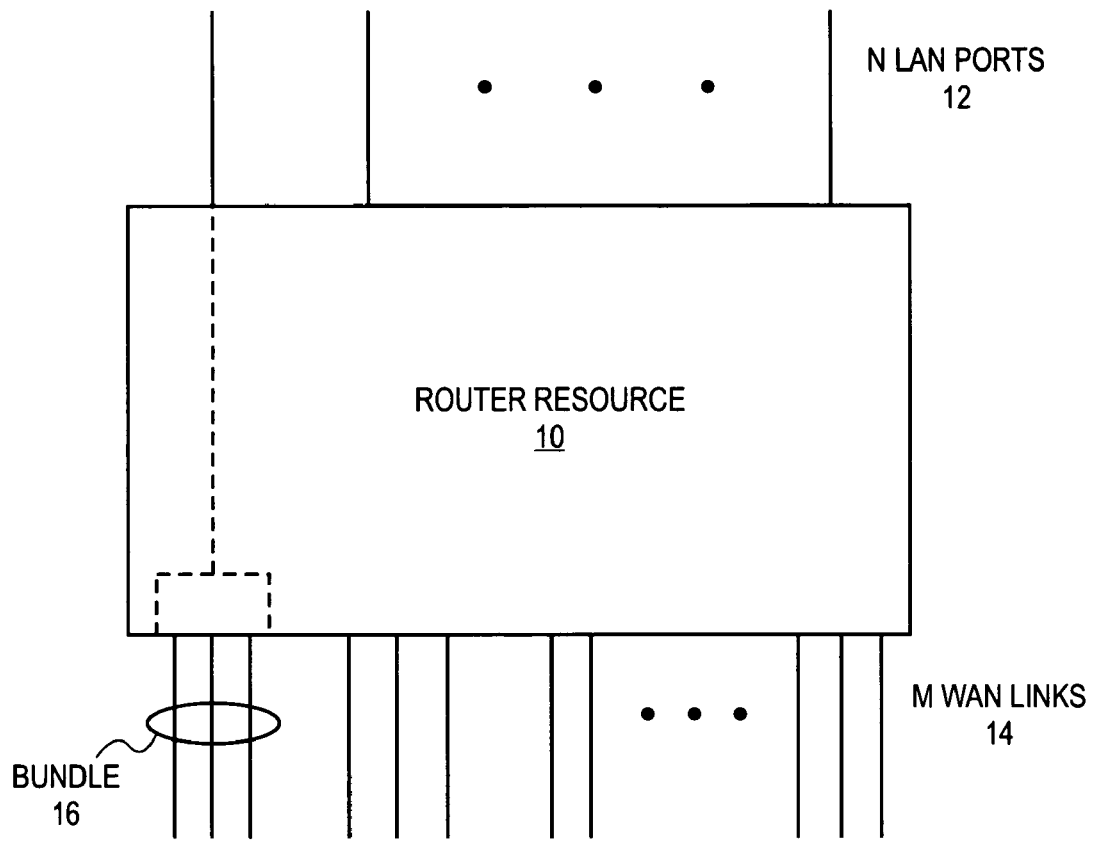
FIG. 1 illustrates a router resource positioned as an interface between a number of LAN interfaces and a number of WAN interfaces.
Figure 2:
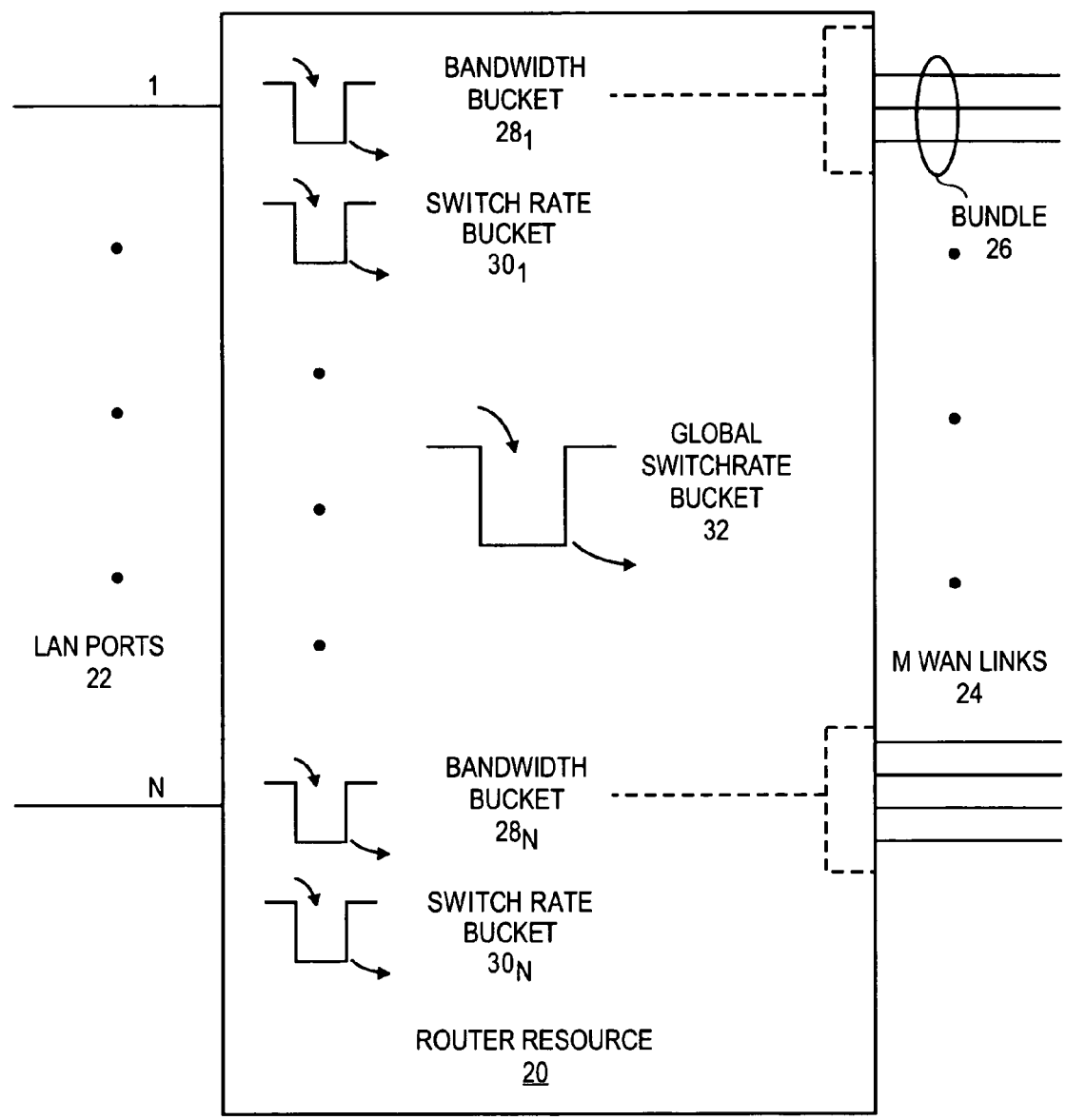
FIG. 2 illustrates the use of bandwidth and switch rate virtual buckets for a router resource in accordance with an embodiment of the present invention.

The general solution provided by the present scheme can be discussed with reference to FIG. 2. As will become apparent, one advantage offered by the present scheme is that traffic on one customer's LAN port (or a few customers' LAN ports) is prevented from dramatically affecting performance on other LAN ports of the router resource. In accordance with the present scheme, software and/or hardware components of a router resource 20 monitor, and when necessary, drop or otherwise control packets inbound on one or more LAN ports 22. This occurs, preferably, at a packet's entry point into the router resource 20. The entry point is chosen because the sooner a packet is dropped, the less impact it will have on the router's overall performance and on other customers' traffic. Further, such an implementation minimizes the overhead involved in processing the dropped packets.

As shown, router resource 20 provides an interface between N number of LAN ports 22 and M number of WAN links 24, where the WAN links may be grouped into bundles 26 (of say 3, 4 or 5 individual WAN links). Associated with each LAN port interface is a bandwidth bucket 28 and a switch rate bucket 30. Those of ordinary skill in the art will appreciate that the term bucket is used herein in a virtual sense. That is, so-called leaky bucket models are used to represent the storage of packets associated with a given interface in router resource 20. In general, router resource 20 may be any network resource that performs a routing function, for example, an Internet protocol (IP) router. In addition to the bandwidth and switch rate buckets 28 and 30 associated with each LAN port 22, a global switch rate bucket 32 for router resource 20 is maintained.

In accordance with the present scheme, each LAN port 22 is assigned a portion of the overall global switch rate capacity of the router resource 20. In some cases, this may involve an equal (or fair) distribution among each of the LAN ports 22 of the global switch rate capacity. In other cases, capacity may be allocated in other than equal amounts, although in such cases the allocation may still be deemed "fair" according to another factor, for example lease cost. One of the goals of the present scheme is to maintain this fair allocation among LAN ports 22, even as one or more of the ports is over driven with traffic. To do so, two basic dimensions are monitored.

First, available bandwidth based on a LAN port's assigned WAN bundle's bandwidth capacity is monitored. This available bandwidth is derived from the bandwidth capacity of each WAN link 24 within a bundle 26, multiplied by the number of links in that bundle. Second, the router resource switching capacity is monitored. Every router resource 20 will have a maximum switching capacity. If an individual LAN port 22 begins to exceed its allocated share of this switching capacity, the present scheme first checks to see whether the router resource 20 as a whole is being utilized at its maximum capacity. If not, then there is no need to throttle back a port that is exceeding its allocated share and that port is allowed to utilize more than its allocated share of the switch rate. However, if the route resource 20 is already operating at its maximum switching capacity, then LAN ports exceeding their allocated share thereof will be throttled back. This prevents excess traffic from individual LAN ports from affecting the performance of other ports.

Monitoring both of the above dimensions ensures good flow control through router resource 20. For example, bandwidth can often be exceeded when the packets making up the traffic on an individual LAN port are relatively large. However, switching capacity may be exceeded when small packet traffic is being processed through router resource 20. By monitoring both dimensions true fairness and efficient flow control can be achieved.

The present scheme differs from existing quality of service/guaranteed service implementations in routers, which typically use a post-routing function that involves bandwidth admission and packet scheduling constraints derived from an output port's capacity. The present scheme is designed for an application where the bandwidth of the output port is deterministic, based on the input port. Thus, the present scheme takes advantage of this deterministic value in order to implement fairness with minimum overhead.

Figure 3:
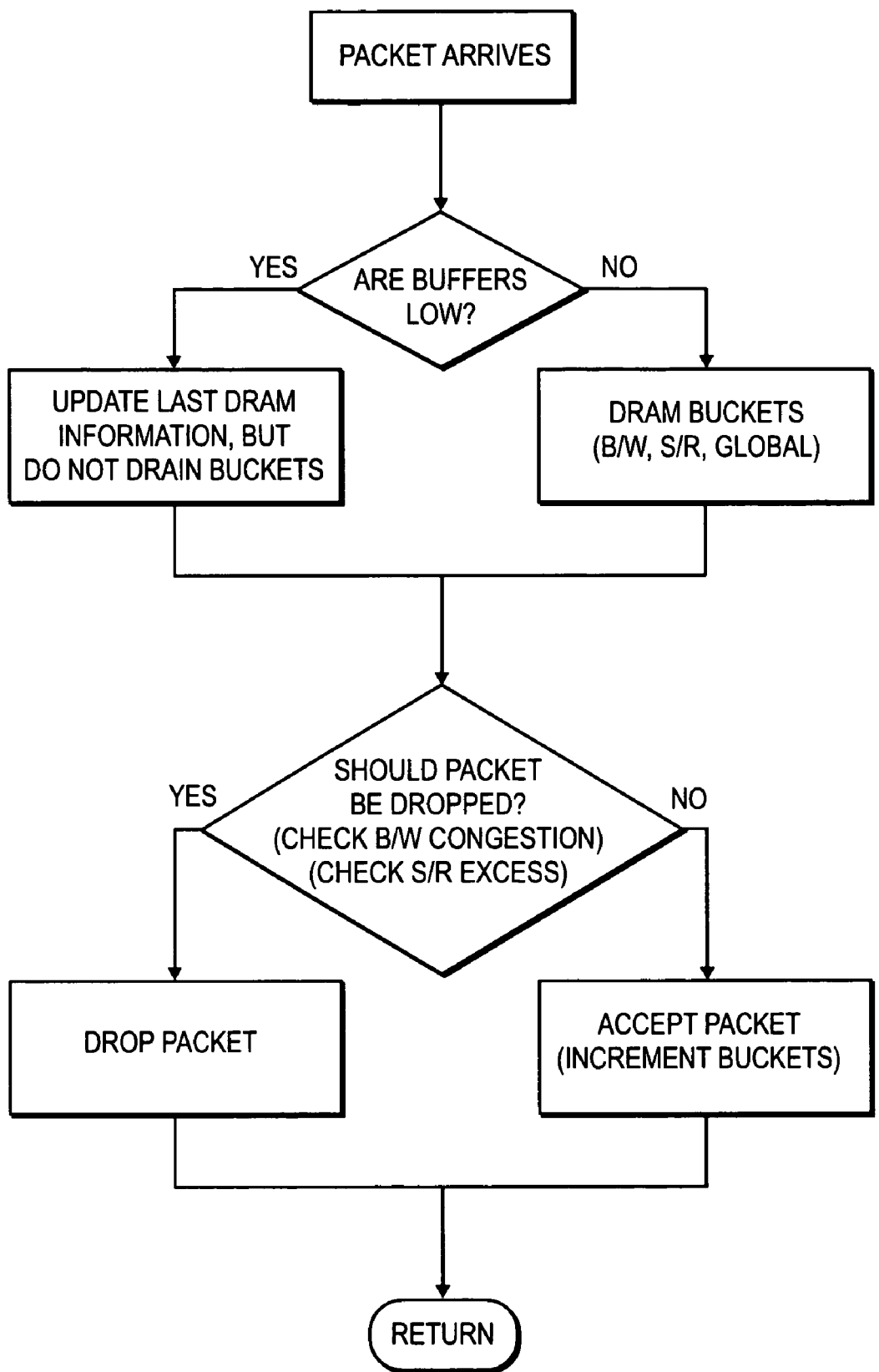
FIG. 3 is a flow diagram illustrating a scheme for determining whether or not packets should be admitted to a router resource in accordance with an embodiment of the present invention.

FIG. 3 provides an example of the overall processing used by the present scheme. For each LAN port 22, as a packet arrives an initial check is made to see whether the buffer associated with that LAN port is getting full. That is, for each inbound LAN port, there will be a memory resource of router resource 20 (referred to as a buffer) that stores packets associated with that LAN port. In some cases, this may be a portion of a shared memory resource for router resource 20. Usually, each buffer has an associated threshold. Thus, the initial check determines whether or not that threshold has been exceeded by the number of packets currently stored for the LAN port.

If the number of packets for the LAN port under consideration is not at or above its associated buffer threshold, then the present scheme may decided not to drain the buckets associated with that LAN port. This can be a helpful implementation where large packet traffic is expected on a LAN port and the latency of the returning LAN input buffers is high.

In a normal case, however, the buckets associated with the LAN port of interest are drained, as is the global switch rate bucket 22. Individual drain rates for the buckets are determined according to their associated parameters. That is, bandwidth buckets 28 are drained at a rate determined by the available bandwidth on the associated WAN bundle 26. Switch rate buckets are drained at a rate according to their allocation of the overall router resource switch rate. The global switch rate bucket 32 is drained according to that portion of the overall switch rate for router resource 20 assigned to the LAN port of interest.

After the above determination as to whether or not the buckets are to be drained is made, a determination as to whether or not the arriving packet should be dropped is made. First, the bandwidth bucket 28 associated with the LAN port of interest is checked. If the bucket is already full, the new packet is not accepted (i.e., it is dropped). Also, the switch rate bucket 30 for the LAN port of interest is checked to see if that port is exceeding its allocation of the global switch rate for router resource 20. Only if the allocated switch rate is being exceeded is the global switch rate bucket 32 checked. If the global switch rate bucket 32 is full, then no additional allocation can be made to LAN port associated with the incoming packet, and the packet will have to be dropped. In such cases, the switch rate bucket associated with the LAN port of interest is throttled back so that it does not exceed its fair share (i.e., the previous allocation of the global switch rate).

Thus, if the present scheme determines that bandwidth congestion or switch rate excess has been experienced, the arriving packet is dropped. Otherwise, the packet is accepted into the buffer associated with the arriving LAN port and the bandwidth and switch rate buckets associated therewith, as well as the global switch rate bucket, are incremented to account for the newly arriving packet.

Thus, the present scheme makes a drop or forward decision for each packet as it arrives on an inbound LAN port. Packets are dropped if the LAN port's inbound bandwidth is exceeding the associated WAN bundle's bandwidth; or the LAN port's input packet switch rate is exceeding its allocated share, and the router resource 20 is operating at maximum switch rate capacity. Individual LAN ports will be allowed to switch at rates beyond their allocated share, but only so long as the router resource 20 is not operating at its maximum capacity. Note, similar decisions can be made for traffic flowing in the reverse direction.

Figure 4A:
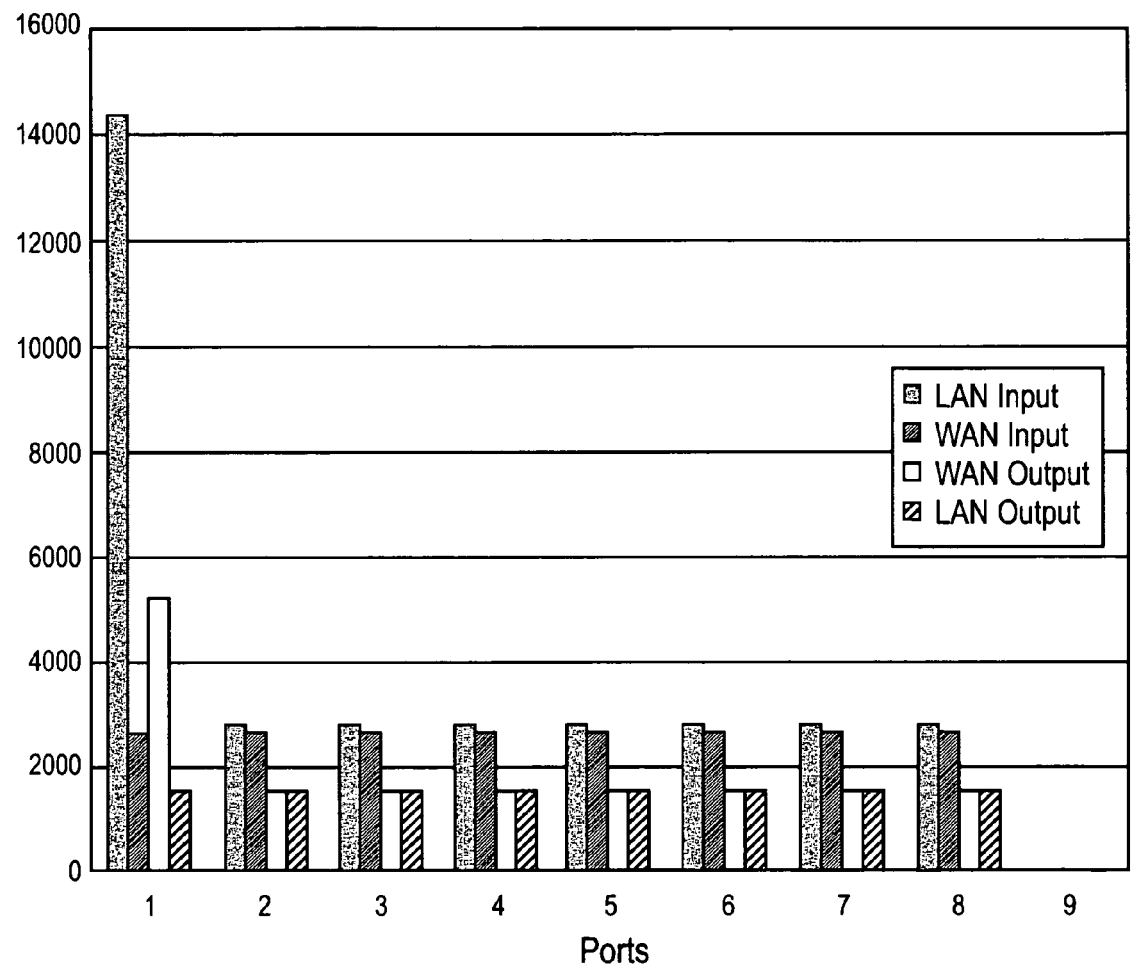
FIGS. 4a-4f illustrate various test results for a router resource under conditions where one or more interfaces are attempting to utilize more than their fair share of bandwidth or switching capacity thereof.

Examples of the effects produced by the present scheme are shown in FIGS. 4a-4f. In FIG. 4a, an example of the input and output traffic on 8 LAN ports and their associated WAN links is illustrated with switching rate (expressed as packets per second) plotted against port number. In this example, 64-bit packets were used and LAN port number 1 was over-driven. That is, the number of packets being presented through LAN port number 1 far exceeded that port's fair allocation (in this case, an equal distribution) of the total available switching rate of the router resource. For this example, the fair allocation mechanism of the present invention was not utilized.

As shown, by over-driving LAN port number 1, the effective output of each of the other LAN ports is far reduced from that of the WAN output associated with LAN port number 1. Although each of LAN ports 2-8 is able to produce approximately the same WAN output, it is clear that LAN port number 1 is robbing these other LAN ports of their fair share of the total available switching rate of the router resource. The figure also shows traffic flow in the reverse direction, which is also affected.

Figure 4B:
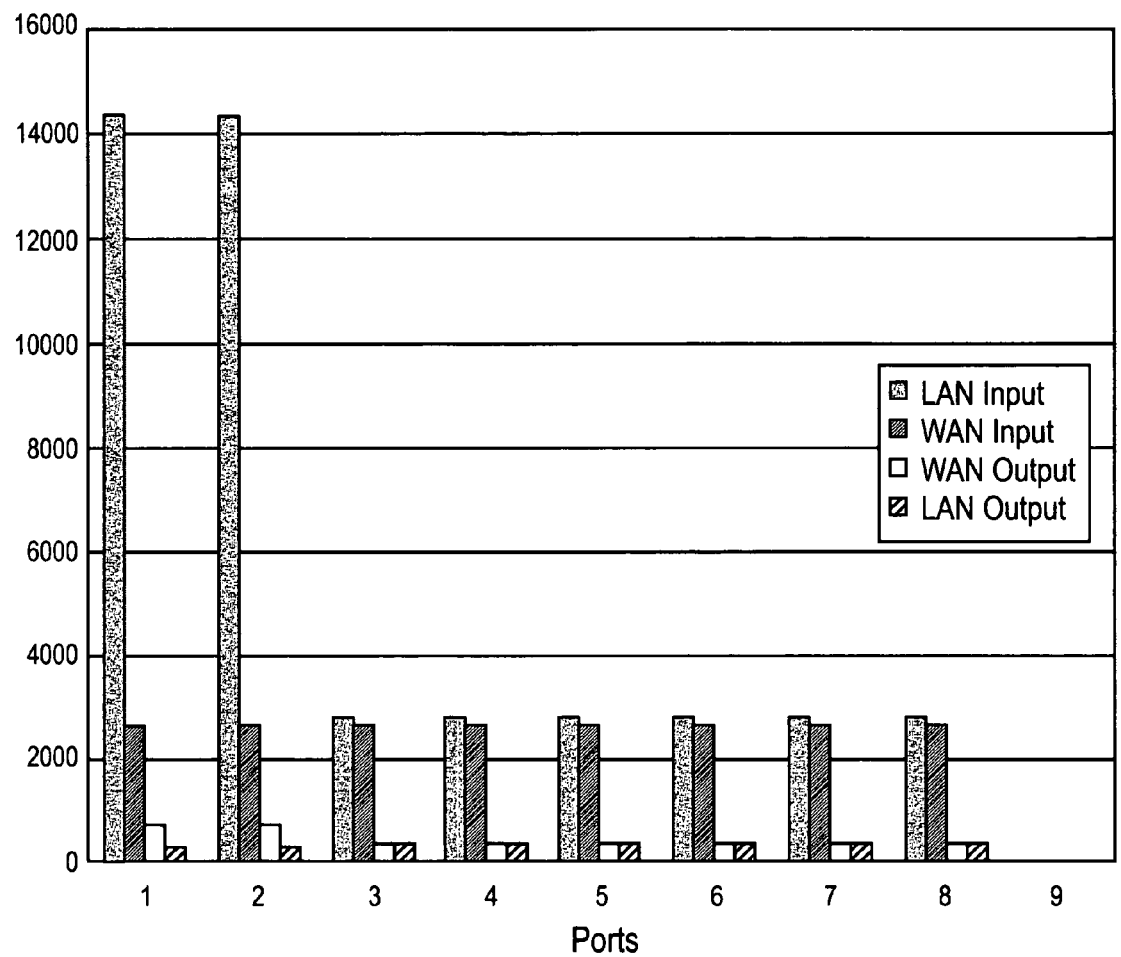

This situation becomes even worse where two LAN ports are over-driven, as shown in FIG. 4*b*. Now, the effective output for LAN ports 3-8 is almost 0.

Figure 4C:
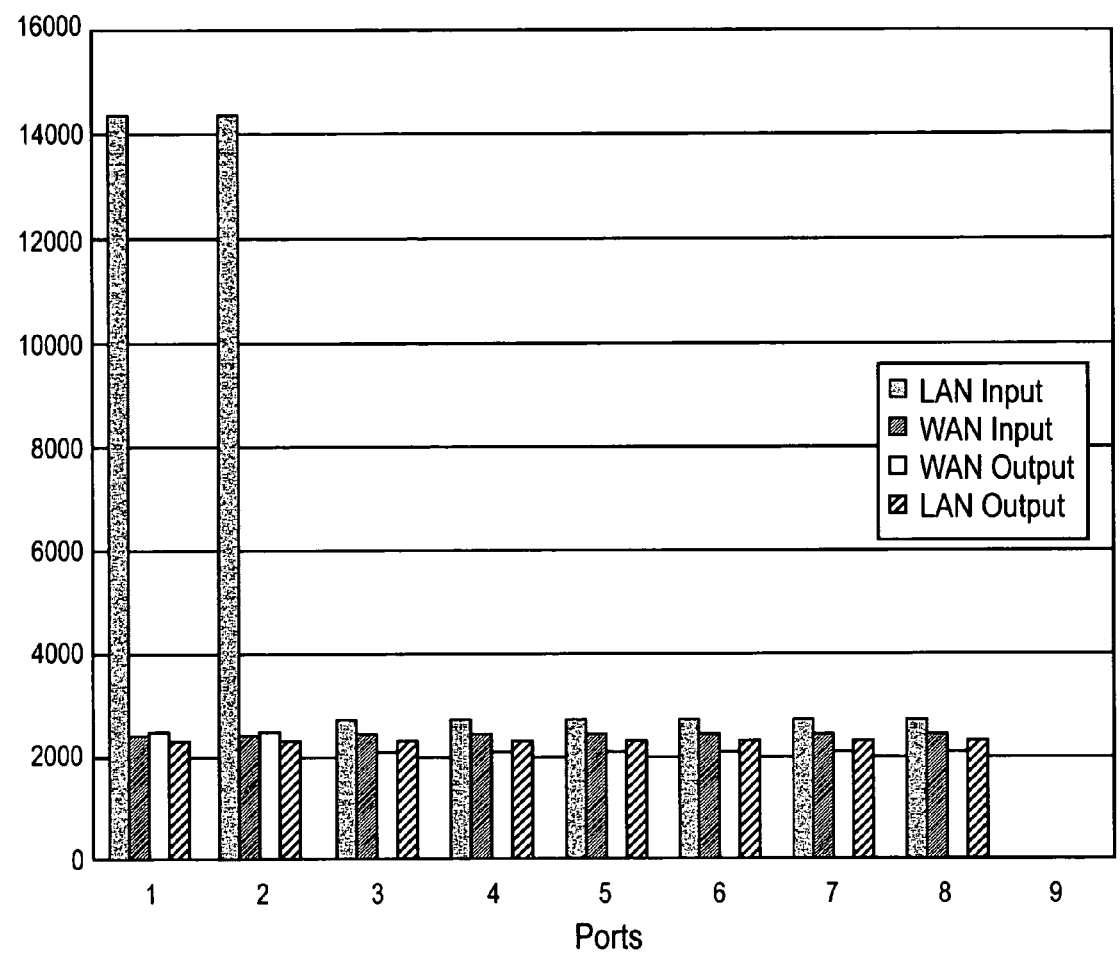

Contrast this with the situation depicted in FIG. 4*c*, where the same two LAN ports are being overdriven, however, the fair allocation scheme of the present invention is introduced. Now, LAN ports 3-8 are provided with their fair share of the overall switch rate of the router resource and are able to switch traffic even in the presence of the greedy LAN ports 1 and 2.

Figure 4D:
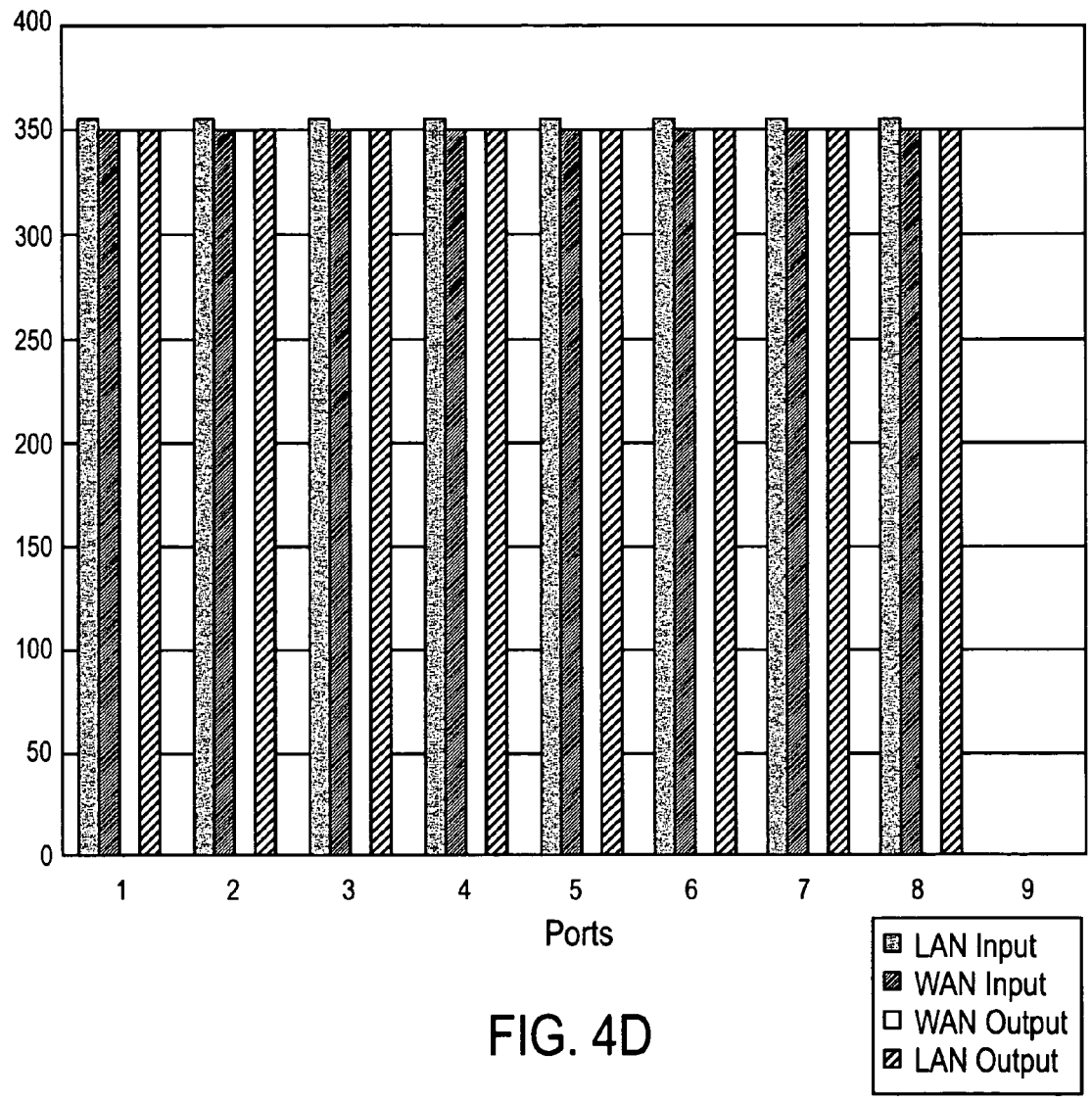

FIG. 4*d* illustrates another case, this time for 1500-bit packets, where each LAN port is being utilized at close to its associated WAN bandwidth capacity. The fair allocation scheme of the present invention ensures that no port is allowed to accept packets in such a way that allows the associated WAN links output bandwidth to be exceeded.

Figure 4E:
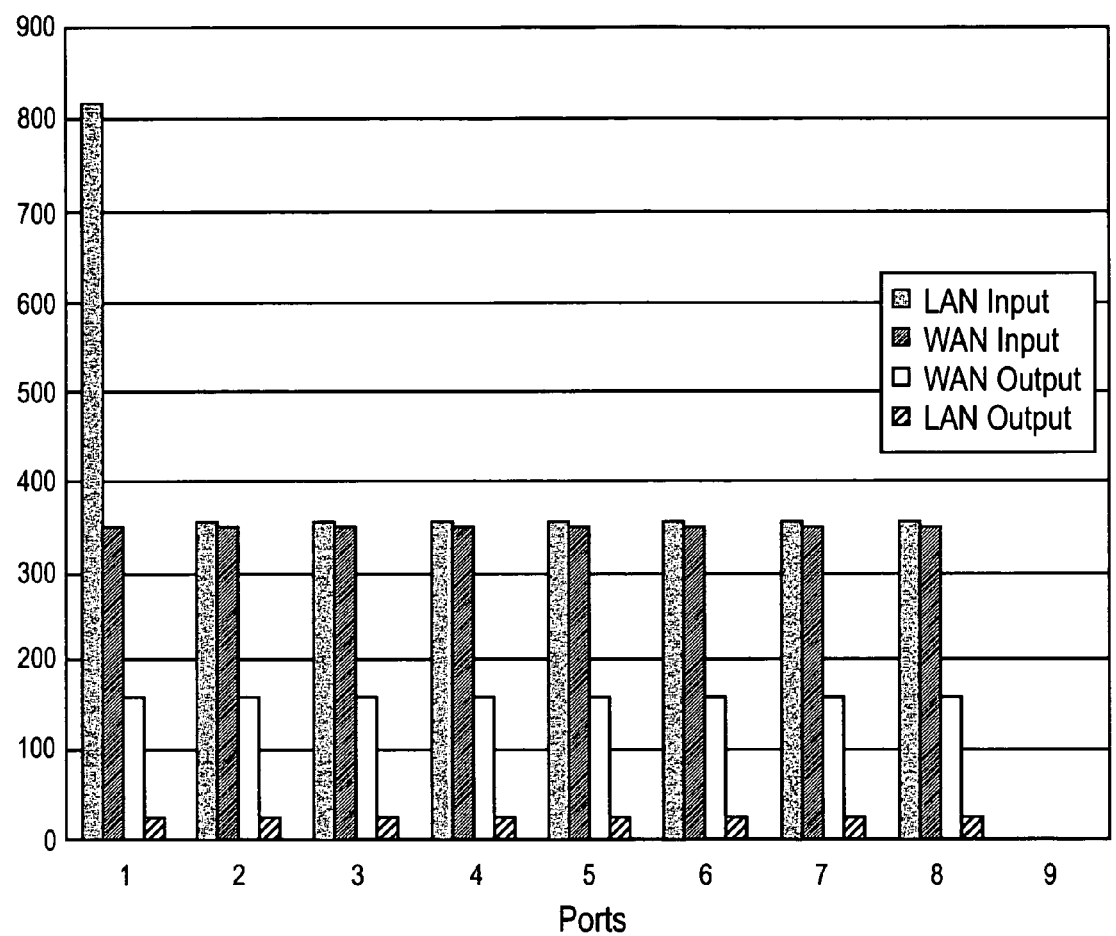

FIG. 4*e* illustrates a situation, again using 1500-bit packets, where one LAN port is being extremely overdriven and the remaining ports do not have the advantage of a fair allocation scheme. Again, WAN output for ports 2-8 are dramatically reduced from that shown in FIG. 4*d*.

Figure 4F:
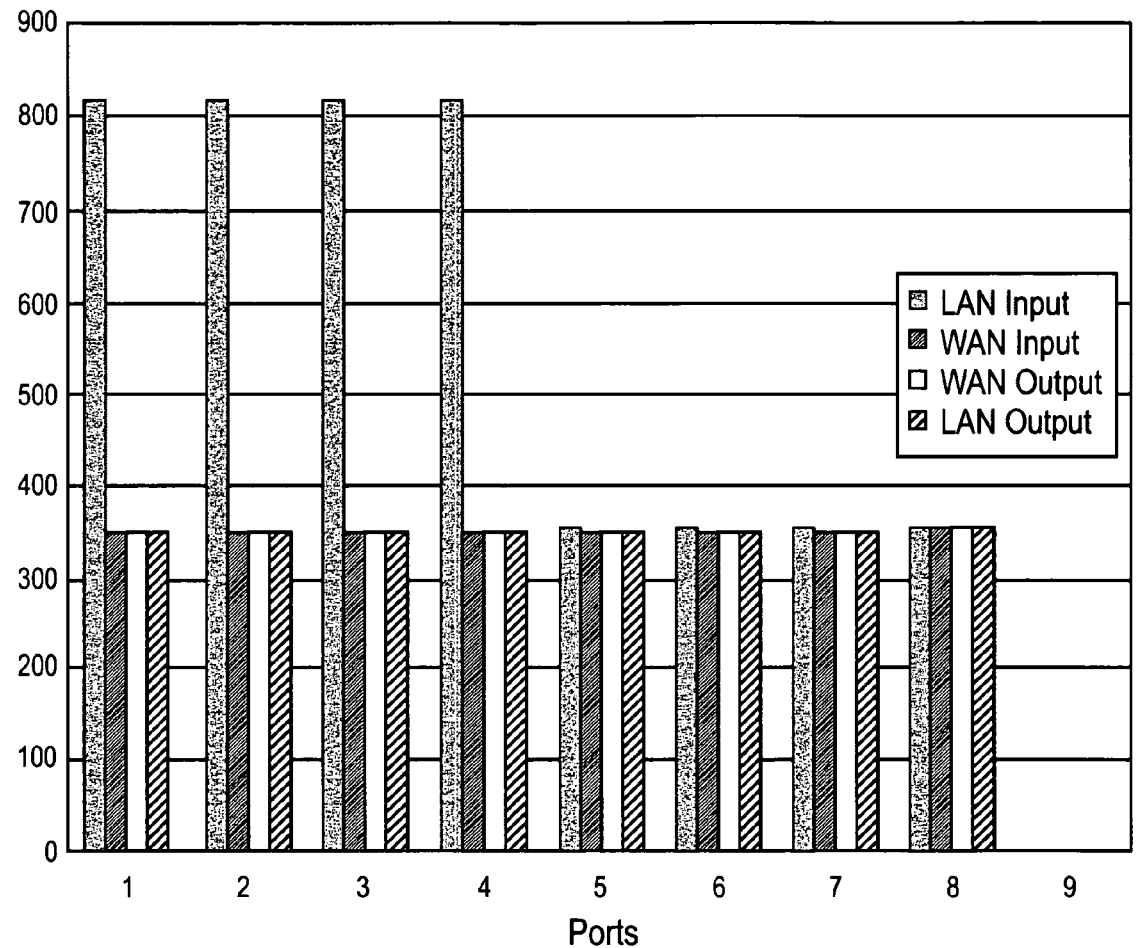

Compare this with the situation illustrated in FIG. 4*f*, where even in the presence of four LAN ports being extremely over-driven, the present fair allocation scheme ensures that the remaining LAN ports still receive their fair share of overall switching capacity. Thus, LAN ports 5-8 are able to switch traffic at a rate equal to their share of the overall switching rate of the router resource.

Thus, a scheme for controlling the utilization of a router resource has been described. This scheme may be embodied in a variety of ways, for example as a server of computer-readable instructions (commonly referred to as software), which may be instantiated in a variety of ways. For example, the software may be embodied as instructed in object code (i.e., machine-readable format) or source code (i.e., human-readable format); as embedded in an integrated circuit (e.g., stored in memory or fashioned as one or more application specific integrated circuits); or as stored on a computer-readable medium (e.g., a floppy disk or CD-ROM). In still other cases, the software may take the form of electronic signals transported through a communication medium (e.g., telephone lines, xDSL lines, wireless communication links, etc.), as when the software is being downloaded from a server or other host platform or is being electronically distributed between two or more computers. Thus, the more general applicability of the present scheme should not be limited by the examples that have been presented herein and, instead, should only be measured in terms of the claims which follows.

What is claimed is:

1. A router resource for switching data traffic having packets of data of a plurality of sizes, the router resource comprising:
    a first number of ingress ports, each ingress port being assigned a portion of an overall global switch rate capacity of the router resource;
    a second number of egress links communicatively coupled to the ingress ports, the egress links being grouped into bundles of one or more egress links, each bundle being assigned to one of the first number of ingress ports, each bundle having an available bandwidth;
    a throttle to drop a packet of data received by an ingress port if accepting the packet would cause the ingress port to exceed the available bandwidth of an egress bundle assigned to the ingress port, or exceed the portion of the switch rate capacity assigned to the ingress port when the router resource is already operating at its maximum switching capacity.

2. The router resource of claim 1, further comprising:
    a first number of bandwidth buckets coupled to the throttle, each bandwidth bucket being associated with one of the first number of ingress ports; and
    a first number of switch rate buckets coupled to the throttle, each switch rate bucket being associated with one of the first number of ingress ports.

3. The router resource of claim 2, wherein the bandwidth buckets and the switch rate buckets are leaky buckets.

4. The router resource of claim 1, wherein the throttle drops the packet of data at the ingress port.

5. The router resource of claim 1, wherein the throttle permits the ingress port to exceed the portion of the switch rate capacity assigned to the ingress port when data traffic from all the ingress ports is less than the overall global switch rate capacity of the router resource.

6. A router for switching data traffic having packets of data of a plurality of sizes, the router comprising:
    a first number of local area network (LAN) ports, each LAN port being assigned a portion of an overall global switch rate capacity of the router;
    a second number of wide area networks (WAN) links communicatively coupled to the LAN ports, the WAN links being grouped into bundles of one or more WAN links, each bundle being assigned to one of the first number of LAN ports, each bundle having an available bandwidth;
    a throttle to drop a packet of data received by a LAN port if accepting the packet would cause the LAN port to exceed the available bandwidth of a WAN bundle assigned to the LAN port, or exceed the portion of the switch rate capacity assigned to the LAN port when the router is already operating at its maximum switching capacity.

7. The router of claim 6, further comprising:
    a first number of bandwidth buckets coupled to the throttle, each bandwidth bucket being associated with one of the first number of LAN ports; and
    a first number of switch rate buckets coupled to the throttle, each switch rate bucket being associated with one of the first number of LAN ports.

8. The router of claim 7, wherein the bandwidth buckets and the switch rate buckets are leaky buckets.

9. The router of claim 6, wherein the throttle drops the packet of data at the LAN port.

10. The router of claim 6, wherein the throttle permits the LAN port to exceed the portion of the switch rate capacity assigned to the LAN port when data traffic from all the LAN ports is less than the overall global switch rate capacity of the router.

11. A router resource for switching data traffic having packets of data of a plurality of sizes, the router resource comprising:
 a first number of ingress ports, each ingress port being assigned a portion of an overall global switch rate capacity of the router resource;
 a second number of egress links communicatively coupled to the ingress ports, the egress links being grouped into bundles of one or more egress links, each bundle being assigned to one of the first number of ingress ports, each bundle having an available bandwidth;
 means for dropping a packet of data received by an ingress port if accepting the packet would cause the ingress port to exceed the available bandwidth of the an egress bundle assigned to the ingress port, or exceed the portion of the switch rate capacity assigned to the ingress port when the router resource is already operating at its maximum switching capacity.

12. The router resource of claim 11, further comprising:
 a first number of bandwidth buckets coupled to the means for dropping the packet of data, each bandwidth bucket being associated with one of the first number of ingress ports; and
 a first number of switch rate buckets coupled to the means for dropping the packet of data, each switch rate bucket being associated with one of the first number of ingress ports.

13. The router resource of claim 12, wherein the bandwidth buckets and the switch rate buckets are leaky buckets.

14. The router resource of claim 11, wherein the means for dropping the packet of data drops the packet of data at the ingress port.

15. The router resource of claim 11, wherein the means for dropping the packet of data permits the ingress port to exceed the portion of the switch rate capacity assigned to the ingress port when data traffic from all the ingress ports is less than the overall global switch rate capacity of the router resource.

* * * * *